United States Patent [19]
Owen et al.

[11] Patent Number: 5,920,321
[45] Date of Patent: Jul. 6, 1999

[54] FLIGHT MANAGEMENT SYSTEM WITH 3-DIMENSIONAL FLIGHT PATH DISPLAY

[75] Inventors: Gary L. Owen, Robins; James M. Suiter, Cedar Rapids, both of Iowa

[73] Assignee: Rockwell International Corporation, Costa Mesa, Calif.

[21] Appl. No.: 08/724,533

[22] Filed: Sep. 30, 1996

[51] Int. Cl.[6] .................................................. G06T 17/00
[52] U.S. Cl. .......................................... 345/427; 345/428
[58] Field of Search .................................... 345/427, 428, 345/418, 419, 423, 424

[56] References Cited

U.S. PATENT DOCUMENTS 4,692,869  9/1987  King et al. ............................. 364/448

Primary Examiner—Phu K. Nguyen
Assistant Examiner—Cliff N. Vo
Attorney, Agent, or Firm—Kyle Eppele; James P. O'Shaughnessy

[57] ABSTRACT

An FMS with a three dimensional representation of the flight plan is disclosed. The view is adjustable via a joystick or other similar controller and is capable numerous varied views, including both a two dimensional lateral view and a two dimensional elevation view. Software is used to effect the changing views.

10 Claims, 6 Drawing Sheets

FLIGHT MANAGEMENT SYSTEM WITH 3-DIMENSIONAL FLIGHT PATH DISPLAY

CROSS REFERENCE TO RELATED APPLICATIONS

This application relates to a patent application Ser. No. 08/723,405, filed Sep. 30, 1996, entitled AUTOMATIC VIEW ADJUSTING FLIGHT PLAN DISPLAY, by James M. Suiter, Jeff Henry and Gary L. Owen, which is filed herewith and is incorporated herein by this reference.

FIELD OF THE INVENTION

The present invention generally relates to flight management systems (FMSs) and more particularly to FMSs with vertical flight path display and even more particularly related to a novel 3-dimensional flight path display for use with an FMS.

BACKGROUND

In recent years, avionics engineers have endeavored to enhance situational awareness and reduce the navigation related work load required of pilots and flight crews. One approach has been to provide the flight crew with a vertical flight path presentation of a particular flight plan.

While this approach does have several beneficial aspects, it has several shortcomings. First of all, is merely a 2-dimensional or cross sectional view of a flight path. Flight crews are required to process information from two separate displays to fully understand the horizontal and vertical aspects of a flight plan. This assimilation of two display types may result in undesirable use of the flight crews attention.

Consequently, there exists a need for an improved system for displaying flight path information.

SUMMARY OF THE INVENTION

It is an object of the present invention to provide an enhanced FMS with reduced requirements of attention by the flight crew.

It is a feature of the present invention to include a 3-dimensional display of a flight path.

It is an advantage of the present invention to reduce the requirement of a flight crew to examine two separate representations of a proposed flight plan prior to complete understanding of the flight plan.

It is another feature of the present invention to include a view angle controller.

It is another advantage of the present invention to provide enhanced ability to adjust the representation of the flight plan information to meet the peculiar desires of any particular flight crew or flight plan.

The present invention is an FMS with enhanced abilities to calculate, display and advise the flight crew of flight path information which is designed to satisfy the aforementioned needs, provide the previously stated objects, include the above listed features, and achieve the already articulated advantages. In the present invention, the work load on a flight crew can be reduced and situational awareness can be increased by providing a display of information which is easier to interpret.

Accordingly, the present invention is an FMS which include a feature therein of generating a 3-dimensional representation of a flight plan.

BRIEF DESCRIPTION OF THE DRAWINGS

The invention may be more fully understood by reading the following description of a preferred embodiment of the invention, in conjunction with the appended drawings wherein.

DETAILED DESCRIPTION

Figure 1A:
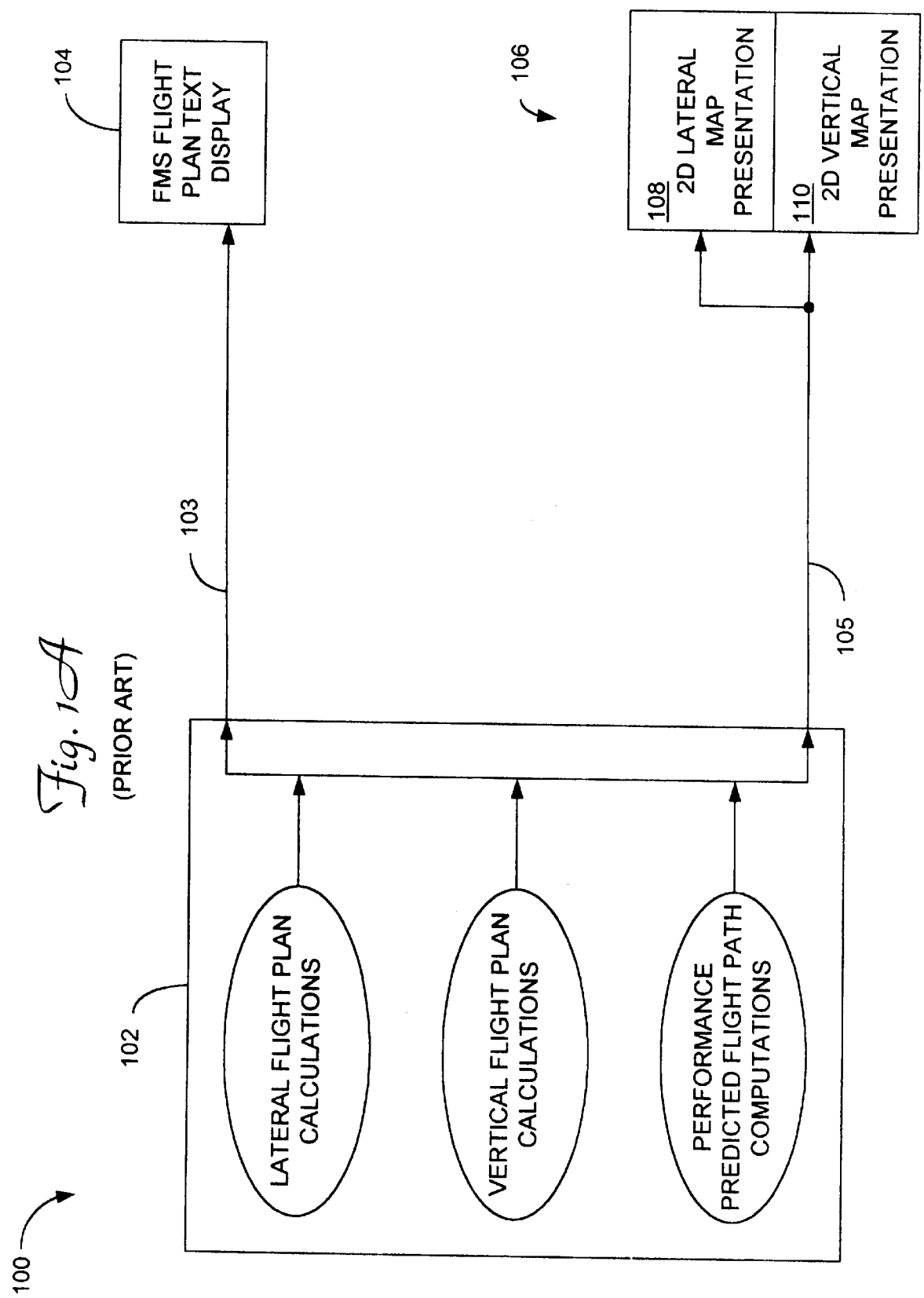
FIG. 1A is block diagram of the FMS of the prior art.

Now referring to the drawings, where like numerals refer to like matter throughout, and more particularly to FIG. 1A, there is shown a block diagram of a flight management system (FMS) of the prior art generally designated 100, of a type which is well known in the art. Flight Management System Computer (FMSC) 102 lateral, vertical and performance predicted flight plan computations in a well known fashion. Coupled to FMSC 102, via digital data bus 103, is control display unit (CDU) 104, which performs the functions of input/output of flight plan text information. Lateral, vertical, and predicted flight path data used for text format, is shared between CDU 104 and FMSC 102. A multifunction display (MFD) 106 is shown coupled, via digital data bus 105, to and sharing lateral, vertical and predicted flight path data used for graphical format with the FMSC 102. The MFD 106 is divided into a 2d lateral map presentation segment 108 and a 2d vertical map presentation segment 110.

Figure 1B:
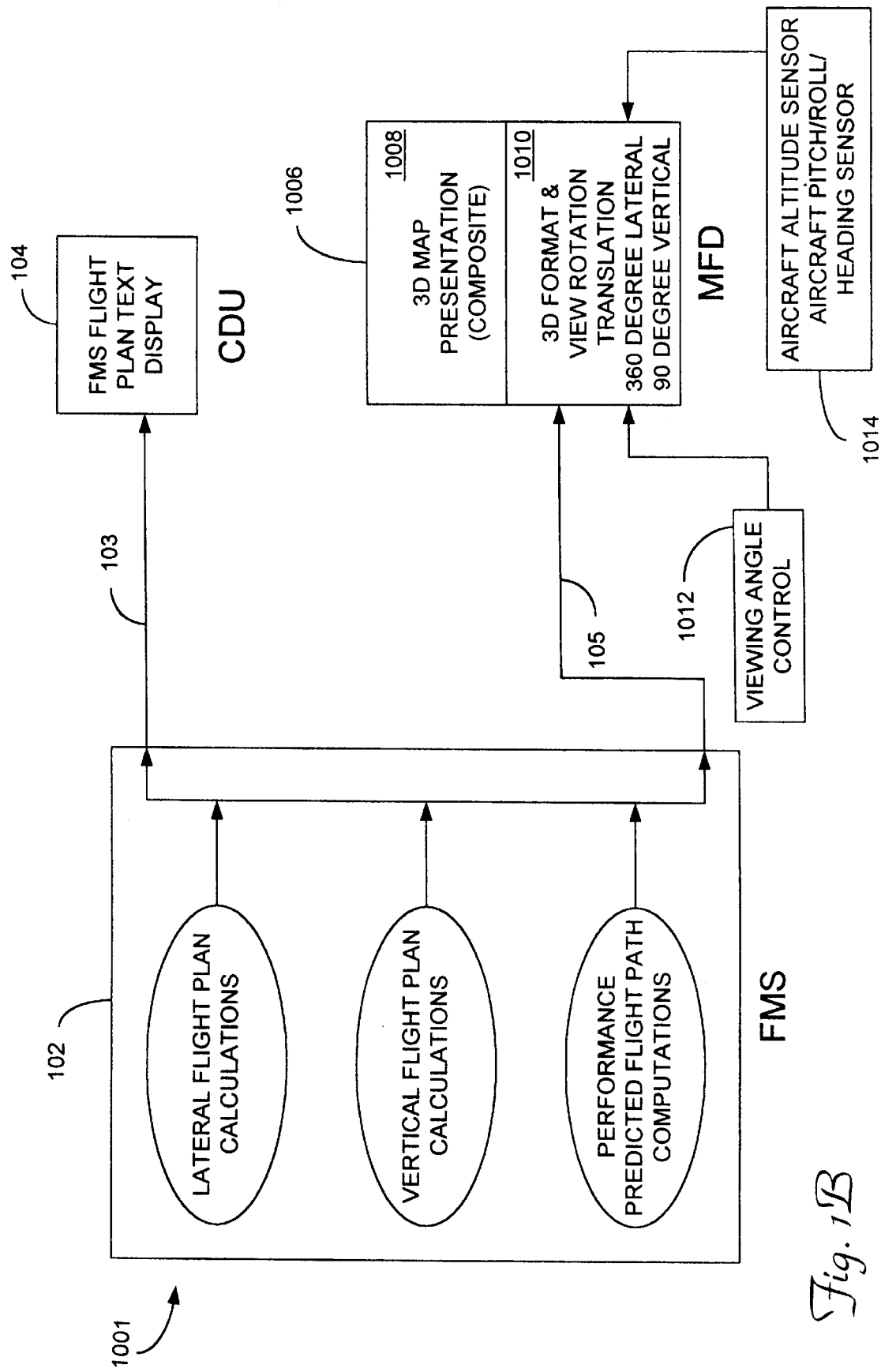
FIG. 1B is block diagram of the FMS of the present invention.
Figure 4:
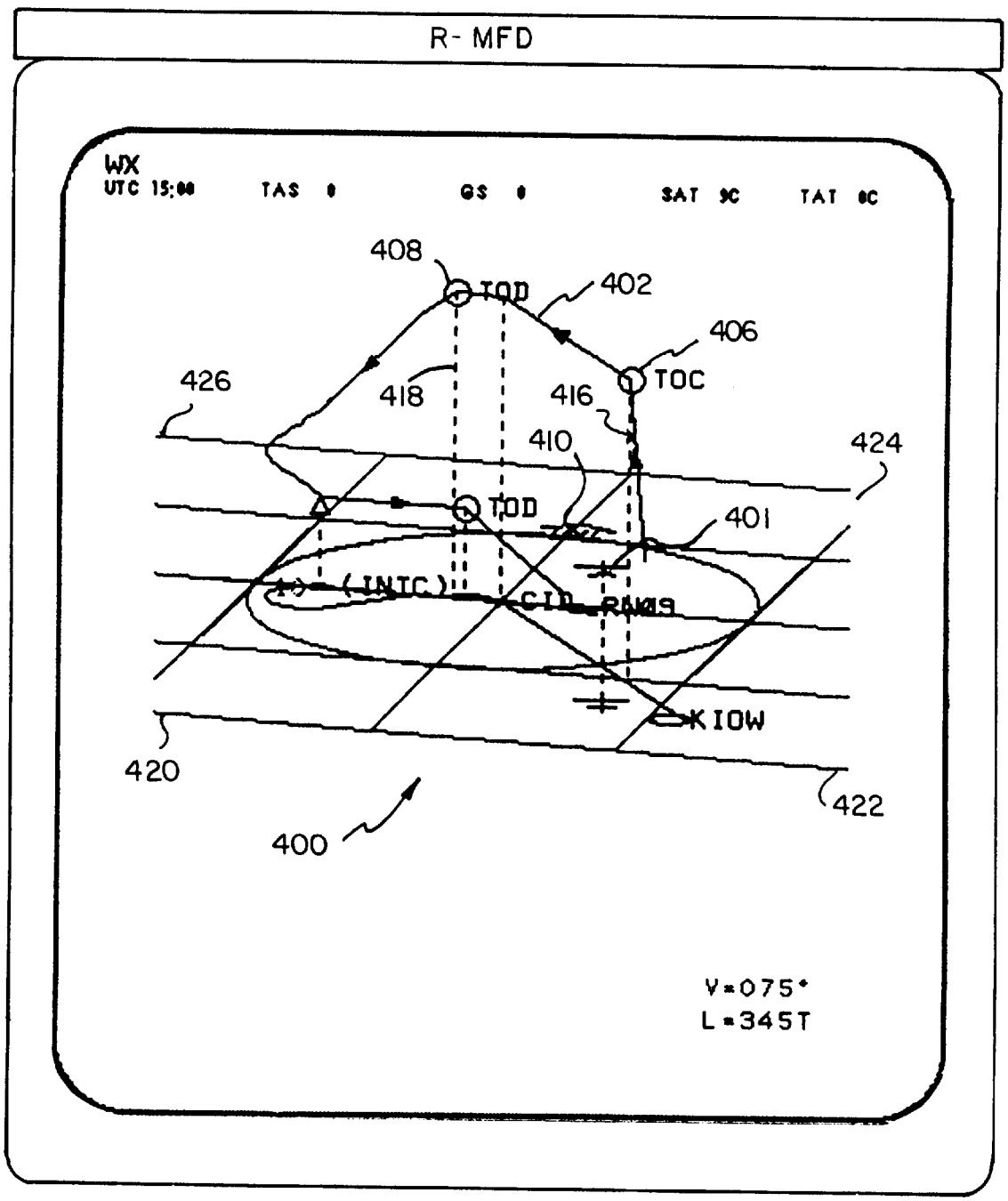
FIG. 4 is a 3 dimensional view of flight plan information in accordance with the present invention.
Figure 5:
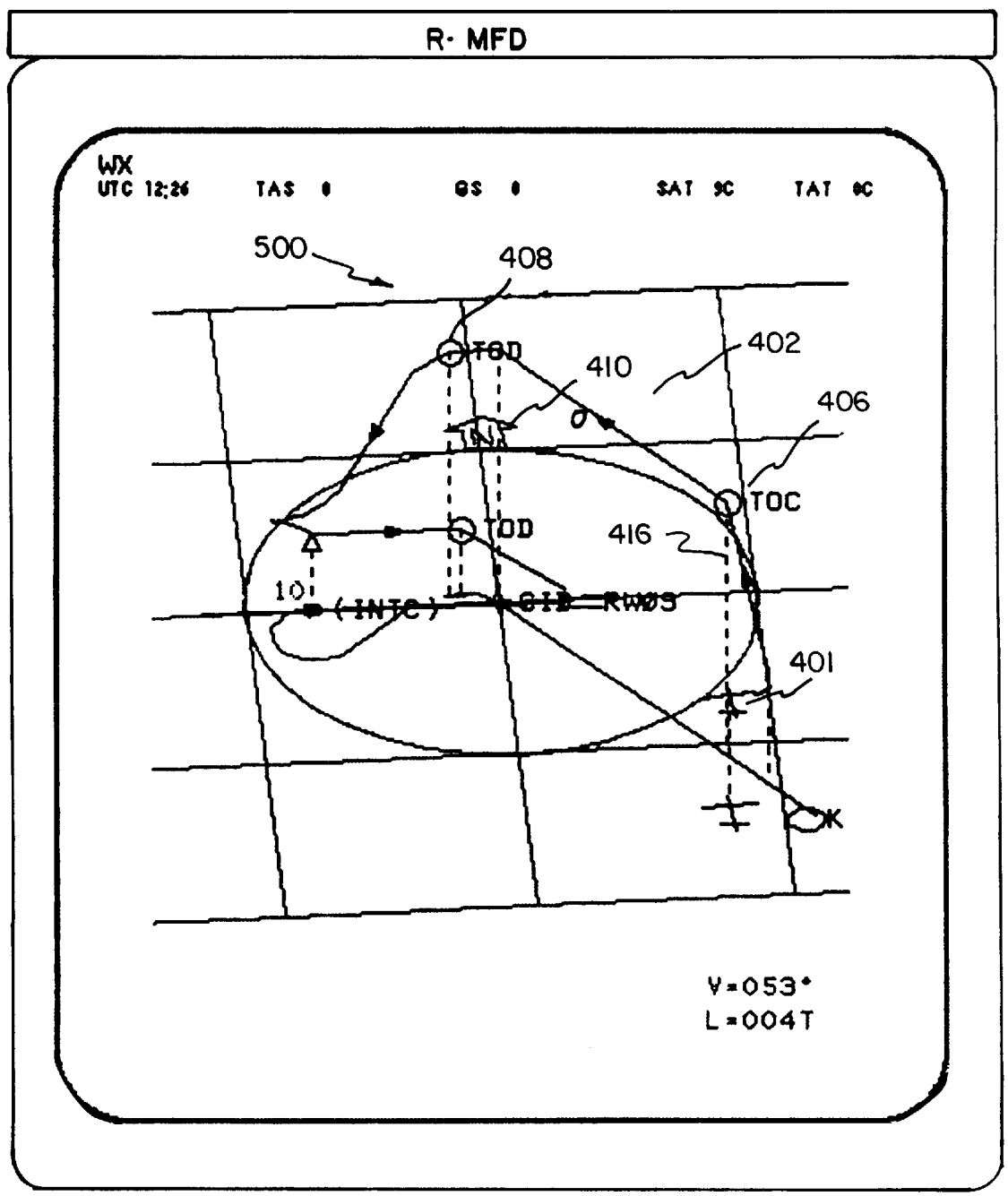
FIG. 5 is another 3 dimensional view of the flight plan information of FIG. 4, but from a different viewing direction.

Now referring to FIG. 1B, there is shown an FMS of the present invention, generally designated 1001, which contains the items numbered 102, 103, 104, and 105 of FIG. 1A. Also shown is a multifunction display 1006, which is very similar to MFD 106, except for software contained therein for presentation and manipulation of 3d views as shown in FIGS. 4 and 5 below. Display 1006 also contains an interface for coupling with view angle control 1012 and aircraft altitude sensor and aircraft pitch/roll/heading/sensor 1014. Control 1012 is preferably a joystick, mouse or other similar well known controller. Sensors 1014 are well known in the art.

Figure 2:
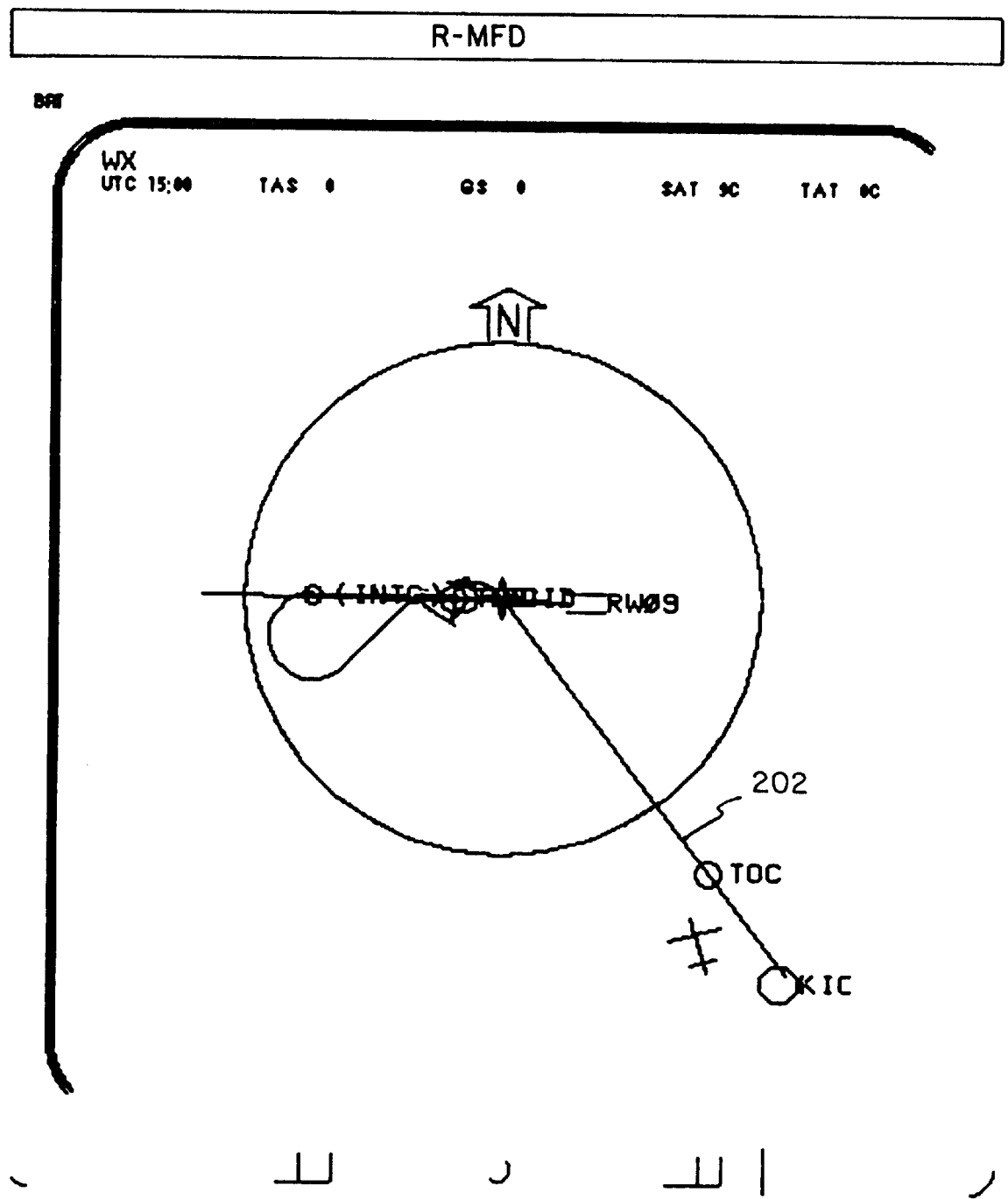
FIG. 2 is a view of a typical 2-dimensional plan representation of flight plan information of the prior art.

Now referring to FIG. 2 there is shown a two dimensional plan view, which is generally designated 200, of a flight plan from Iowa City to Cedar Rapids, which is typical of prior art FMSs. The view typically is from a viewing direction which is orthogonal to the ground and is occasionally referred to as a "God's eye view" because of its orientation high and directly above the flight plan. The solid line 202 extending from the lower right side to the mid left-side and back to the center of the display and connecting the various circled waypoints, is the planned path of the aircraft.

Figure 3:
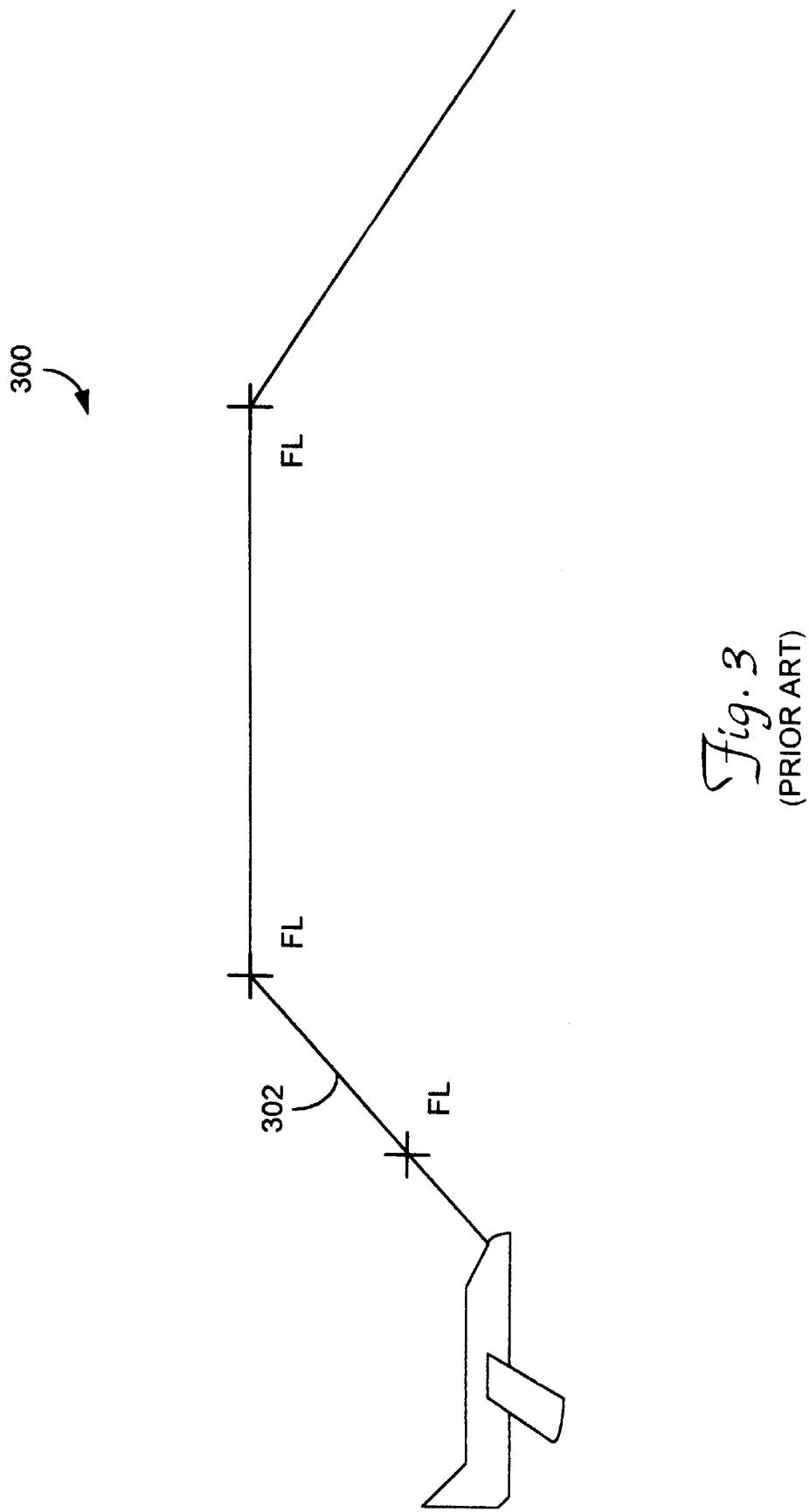
FIG. 3 is a view of a typical 2-dimensional side representation of flight plan information of the prior art.

Now referring to FIG. 3, there is shown a two dimensional elevation or side view, generally designated 300, of a portion of the flight plan of FIG. 2, which is typical of prior art FMSs and which is taken along a line which is parallel with the surface of the ground. The solid line 302 represents the planned path of the aircraft.

Now referring to FIG. 4, there is shown a three dimensional view, generally designated 400, of a portion of the flight plan shown in FIGS. 2 and 3, which is in accordance with the present invention. There is shown a solid line 402 which represents the planned path of the aircraft 401. Also shown is grid 404 which is a planar representation of the earth's surface. Several intermediate points are shown disposed along the flight path which represent numerous maneuver points. For example, 406 is a TOC point, and 408 is a TOD point. The vertical dashed lines 416 and 418 extending from points 406 and 408 respectively, represent the altitude of the planned path above these points. Grid 404 has lower left corner 420, a lower right corner 422, an upper right corner 424, and an upper left corner 426. The view 400 is drawn from a point which is above, behind and to the left of a line 402 which is the current leg of the flight plan. The actual lateral reference direction is 345 degrees or 15 degrees west of north. North is depicted by north pointer 410. The vertical viewing direction is 75 degrees inclined with respect to a straight down or "God's eye view" of FIG. 2.

Now referring to FIG. 5, there is shown another three dimensional view, generally designated 500 of the same portion of the flight plan shown in FIG. 4. View 500 is drawn from a different lateral and vertical viewing angle, which demonstrates the flexibility of the present invention. View 500 is taken along a lateral viewing direction of 4 degrees or 4 degrees east of north. The vertical viewing angle is 53 degrees inclined from a straight down view of FIG. 2.

In operation, the FMS is operated in much the same manner as prior art FMSs except that a three dimensional flight plan is generated by the MFD 1006 in accordance with the software disclosed in the appendix. The view point of the observer can be changed with the aid of the control 1012. Depending upon the preference of the operator the orientation of the overall view can be adjusted to many possible viewpoints. For example the view can be adjusted so that the observer is orthogonal (a 0 degree vertical viewing angle) to the ground and a 2 dimensional plan view, much like FIG. 2, is displayed. When the viewing direction changes away from an orthogonal line the display becomes three dimensional until the viewing direction is adjusted back to an orthogonal line or one that is parallel (a 90 degree vertical viewing angle) to the ground. When the view direction is parallel to the ground a two dimensional elevation view is displayed much like FIG. 3.

FIGS. 4 and 5 depict 3-dimension flight plans in a plan mode, i.e. the aircraft progresses along the stationary flight path line. An alternative embodiment of the present invention is to use a present position approach in which the display depicts the progression of the flight by moving the flight path line with respect to a stationary centrally disposed aircraft.

Now referring to the appendix, there is disclosed a group of source code listings, in the ADA programming language, which could be used by a processor in the display or FMSC. The partitioning of software and computational tasks between the numerous elements of system is a matter of individual designers choice.

It is thought that the FMS, of the present invention, will be understood from the foregoing description and it will be understood from the foregoing description and it will be apparent that various changes may be made in the form, construction, steps and the arrangement of the parts and steps, without departing from the spirit and scope of the invention or sacrificing all of their material advantages, the form herein being merely preferred or exemplary embodiments thereof.

We claim:

1. A flight management system comprising:
   a flight management system computer for performing lateral flight plan calculations, vertical flight plan calculations and performance predicted flight path computations;
   a control display unit for displaying textual information regarding flight plan information and for allowing input and output of information with a flight crew, the control display unit coupled to the flight management system computer;
   a display for displaying 3-dimensional map presentations of a flight plan, the display coupled to the flight management system computer;
   the viewing angle control for allowing flight crew adjustment of a viewing angle of the 3-D map presentation, the viewing angle control coupled to the display; and,
   3-D map presentation generation means for generating a 3-dimensional map relating to the flight plan.

2. Flight management system comprising a flight management computer;
   a control display unit;
   a display;
   a viewing angle control;
   means for interconnecting said control display unit, said viewing angle control, said flight management system computer and said display; and,
   means for generating a 3-dimensional map presentation relating to a flight plan.

3. A flight management system of claim 2, wherein said means for interconnecting further comprises means for electronically coupling a viewing angle control with the display.

4. A flight management system of claim 2, wherein the means for interconnecting further comprises means for electronically coupling the viewing angle control to the flight management system computer.

5. A flight management system of claim 2, wherein the means for generating a 3-D map presentation is performed within the flight management system computer.

6. A flight management system of claim 2, wherein the means for generating a 3-D map presentation is coupled to the display.

7. A flight management system of claim 6, wherein the means for interconnecting includes means for electronically coupling the viewing angle control with the display.

8. A flight management system of claim 7 further comprising aircraft altitude sensor means coupled to the display.

9. A flight management system of claim 8 further comprising aircraft pitch/roll/heading sensor means coupled to the display.

10. A flight management system of claim 9, wherein the means for generating a 3-dimensional map presentation generates a 2-dimensional lateral view when the viewing angle controller is disposed in a predetermined position and generates a 2-dimensional profile view when the viewing angle controller is in a second predetermined position, and generates 3-dimensional map presentations when the viewing angle controller is disposed in intermediate predetermined positions between said first predetermined position and said second predetermined position.

* * * * *